United States Patent
Chowdhury et al.

(10) Patent No.: US 7,266,257 B1
(45) Date of Patent: Sep. 4, 2007

(54) REDUCING CROSSTALK IN FREE-SPACE OPTICAL COMMUNICATIONS

(75) Inventors: Aref Chowdhury, Berkeley Heights, NJ (US); Gregory Raybon, Shrewsbury, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/485,091

(22) Filed: Jul. 12, 2006

(51) Int. Cl.
*G02F 1/035* (2006.01)
*H04B 10/00* (2006.01)

(52) U.S. Cl. ............... 385/1; 385/3; 385/24; 398/119; 398/147; 398/159

(58) Field of Classification Search ............... 385/13, 385/1, 3, 8–9, 11, 24; 398/118, 119, 147, 398/158, 159, 160
See application file for complete search history.

(56) References Cited

U.S. PATENT DOCUMENTS

| | | | |
|---|---|---|---|
| 5,141,459 A | 8/1992 | Zimmerman | 445/24 |
| 5,193,023 A | 3/1993 | Yamada et al. | 359/245 |
| 5,218,771 A | 6/1993 | Redford | 33/366 |
| 5,334,908 A | 8/1994 | Zimmerman | 313/336 |
| 5,341,390 A | 8/1994 | Yamada et al. | 372/45 |
| 5,345,456 A | 9/1994 | Dai et al. | 372/22 |
| 5,355,247 A | 10/1994 | Byer et al. | 359/330 |
| 5,363,021 A | 11/1994 | MacDonald | 313/304 |
| 5,396,361 A | 3/1995 | Sasaki et al. | 359/124 |
| 5,420,876 A | 5/1995 | Lussier et al. | 372/22 |
| 5,440,574 A | 8/1995 | Sobottke et al. | 372/34 |
| 5,450,429 A | 9/1995 | Klemer et al. | 372/22 |
| 5,475,526 A | 12/1995 | Byer et al. | 359/330 |
| 5,479,431 A | 12/1995 | Sobottke et al. | 372/92 |
| 5,617,235 A | 4/1997 | Abrahamson | 359/142 |
| 5,628,659 A | 5/1997 | Xie et al. | 445/3 |
| 5,793,791 A | 8/1998 | Lasser et al. | 372/69 |
| 5,814,156 A | 9/1998 | Elliott et al. | 134/1 |
| 5,915,164 A | 6/1999 | Taskar et al. | 438/47 |
| 5,969,467 A | 10/1999 | Matsuno | 313/309 |
| 6,013,221 A | 1/2000 | Byer et al. | 264/436 |
| 6,172,325 B1 | 1/2001 | Baird et al. | 219/121.62 |

(Continued)

FOREIGN PATENT DOCUMENTS

JP 8-51248 2/1996 ............ 3/18

(Continued)

OTHER PUBLICATIONS

U.S. Appl. No. 11/138,007, filed May 26, 2006, Chowdhury et al.

(Continued)

*Primary Examiner*—Hemang Sanghavi
(74) *Attorney, Agent, or Firm*—John F. McCabe

(57) ABSTRACT

An optical transmitter includes a modulator, a dispersion adjustment module, and an optical amplifier. The optical transmitter is configured to transmit optical pulses over a free-space optical communication channel. The modulator is configured to produce an optical carrier that is amplitude and/or phase modulated by data. The dispersion adjustment module is connected between the modulator and the amplifier and is configured to substantially change temporal widths of optical pulses received from the modulator by changing dispersions of the received optical pulses.

17 Claims, 11 Drawing Sheets

U.S. PATENT DOCUMENTS

| | | | |
|---|---|---|---|
| 6,218,771 B1 | 4/2001 | Berishev et al. | 313/311 |
| 6,351,482 B1 | 2/2002 | Puzey | 372/99 |
| 6,448,100 B1 | 9/2002 | Schulte et al. | 438/20 |
| 6,555,293 B1 | 4/2003 | Fejer et al. | 430/311 |
| 6,631,246 B2 | 10/2003 | Ford et al. | 398/158 |
| 6,741,763 B1 * | 5/2004 | Taylor | 385/3 |
| 6,748,142 B2 | 6/2004 | Madsen | 385/49 |
| 6,807,321 B2 | 10/2004 | Madsen | 385/11 |
| 6,809,351 B2 | 10/2004 | Kuramoto et al. | 257/190 |
| 6,856,450 B2 | 2/2005 | Chowdhury et al. | 359/326 |
| 7,099,073 B2 | 8/2006 | Chowdhury et al. | 359/332 |
| 2002/0181059 A1 | 12/2002 | Christopher | 359/172 |
| 2003/0206691 A1 | 11/2003 | Puzey | 385/24 |

FOREIGN PATENT DOCUMENTS

| | | |
|---|---|---|
| WO | WO 92/02031 | 2/1992 |
| WO | WO 00/74107 A2 | 12/2000 |
| WO | WO 2004/025733 A1 | 3/2004 |

OTHER PUBLICATIONS

U.S. Appl. No. 10/082,370, filed Feb. 25, 2002, Schnitzer.
U.S. Appl. No. 09/896,783, filed Jun. 29, 2001, Bethea et al.
Eyres, L.A. et al., *All-epitaxial fabrication of thick, orientation-patterned GaAs films for nonlinear optical frequency conversion*, Applied Physics Letters, vol. 79, No. 7, Aug. 13, 2001, pp. 904-906.
Pejer, M.M. et al, *Quasi-Phase-Matched Second Harmonic Generation: Tuning and Tolerances*, IEEE Journal of Quantum Electronics, vol. 28, No. 11, Nov. 1992, pp. 2631-2654.
Stutzmann, M. et al., *Playing with Polarity*, Physica Status Solidi B-Basic Research, vol. 228 No. 2, Nov. 2001, pp. 505-512.
Mileham, J.R., et al., "West chemical etching of AlN," (American Institute of Physics), Appl. Phys. Lett. 67(8), Aug. 21, 1995, pp. 1119-1121, USA.
Kozawa, T., et al., "Field emission study of gated GaN and $Al_{0.1}Ga_{0.9}N$/GaN pyramidal field emitter arrays," (American Institute of Physics), Appl. Phys. Lett., vol. 75, No. 21, Nov. 22, 1999, pp. 3330-3332, USA.
Huang, D., et al., "Dependence of GaN polarity on the parameters of the buffer layer grown by molecular beam epitaxy," (American Institute of Physics), Applied Physics Letters, vol. 78, No. 26, Jun. 25, 2001, pp. 4145-4147, New York, USA.
Visconti, P., et al., "Investigation of defects and surface polarity in GaN using hot wet etching together with microscopy and diffraction techniques," (Elsevier) Materials Science and Engineering, vol. B 93, 2002, pp. 229-233.
Ng. Hock M., et al., "Patterning GaN Microstructures by Polarity-Selective Chemical Etching," (Japanese Society of Applied Physics), Japanese Journal of Applied Physics, vol. 42, Dec. 1, 2003, pp. L1405-L1407.
European Search Report dated Sep. 8, 2004 for EP Appl. No. 04250979.4-2203.
Weyher, J.L., Muller, S., Grzegory, I., and Porowski, S., "*Chemical Polishing of Bulk and Epitaxial GaN*," Journal of Crystal Growth, vol. 182 (1997), pp. 17-22.
Kozawa, T., Ohwaki, T., and Taga, Y., "*Field Emission Study of Gated GaN and $Al_{0.1}Ga_{0.9}N$/GaN Pyramidal Field Emitter Arrays*," Applied Physics Letters, vol. 75, No. 21, Nov. 22, 1999, pp. 3330-3332.
Sowers, A.T., Christman, J.A., Bremser, M.D., Ward, B.L., Davis, R.F., and Nemanich, R.J., "*Thin Films of Aluminum Nitride and Aluminium Gellium Nitride for Cold Cathode Applications*," Applied Physics Letters, vol. 71, No. 16, Oct. 20, 1997, pp. 2289-2291.
Seelmann-Eggebert, M., Weyher, J.L., Obloh, H., Zimmermann, H., Rar, A., and Porowski, S., "*Polarity of (00.1) GaN Epilayers Grown on a (00.1) Sapphire*," Applied Physics Letters, vol. 71, No. 18, Nov. 3, 1997, pp. 2635-2637.
U.S. Appl. No. 10/259,051, filed Sep. 27, 2002, Chowdhury, et al.
U.S. Appl. No. 10/442,287, filed May 20, 2003, Chowdhury, et al.
U.S. Appl. No. 10/441,532, filed May 20, 2003, Chowdhury, et al.
U.S. Appl. No. 10/729,153, filed Dec. 5, 2003, Chowdhury, et al.
U.S. Appl. No. 10/835,753, filed Apr. 30, 2004, Chowdhury, et al.
U.S. Appl. No. 10/932,980, filed Sep. 2, 2004, Chowdhury, et al.
Martin M. Fejer, et al, "Quasi-Phase-Matched Second Harmonic Generation: Tuning and Tolerances," *IEEE Journal of Quantum-Electronics*, vol. 28, No. 11, (Nov. 1992)., pp. 2631-2654.
B. Mikkelsen, et al., "Reduction of Crosstalk in Semiconductor Optical Amplifiers by Amplifying Dispersed WDM Signals (7 × 20 Gb/s)," *OFC 2000*, Baltimore, MD, (3/7-10/00), Paper No. ThJ5, 5 pages.
A. Chowdhury, et al, "Compensation of Intra-channel Nonlinearities in 40 Gb/s Pseudo-Linear Systems Using Optical Phase Conjugation," *Optical Fiber Communication Conference 2004*, Los Angeles, CA, Paper PDP32 (2/22-27/04), 4 pages.
A. Chowdhury, et al, "Optical Phase Conjugation in a WDM CSRZ Pseudo-Linear 40 Gb/s System for 4,800 km Transmission," *European Conference on Optical Communication 2004*, Stockholm, Sweden, Paper Th4.5.6, (9/5-9/04), 2 pages.
A. Chowdhury, et al, "Optical Phase Conjugation and Pseudolinear Transmission," *Optics Letters, 2004, Optical Society of America*, vol. 29, No. 10, pp. 1105-1107.
Szajowski, P.F. et al., *2.4 km Free-Space Optical Communication 1550 nm Transmission Link Operating at 2.5 Gb/s—Experimental Results*, SPIE, vol. 3532, Nov. 1998, pp. 29-40.
Martini, R. et al., *High-speed modulation and free-space optical audio/video transmission using quantum cascade lasers*, Electronics Letters, vol. 37, No. 3, Feb. 1, 2001, pp. 191-193.
Blaser, S. et al., *Free-space optical data link using Peltier-cooled quantum cascade laser*, Electronics Letters, vol. 37, No. 12, Jun. 7, 2001, pp. Jun. 7, 2001, pp. 778-780.

* cited by examiner

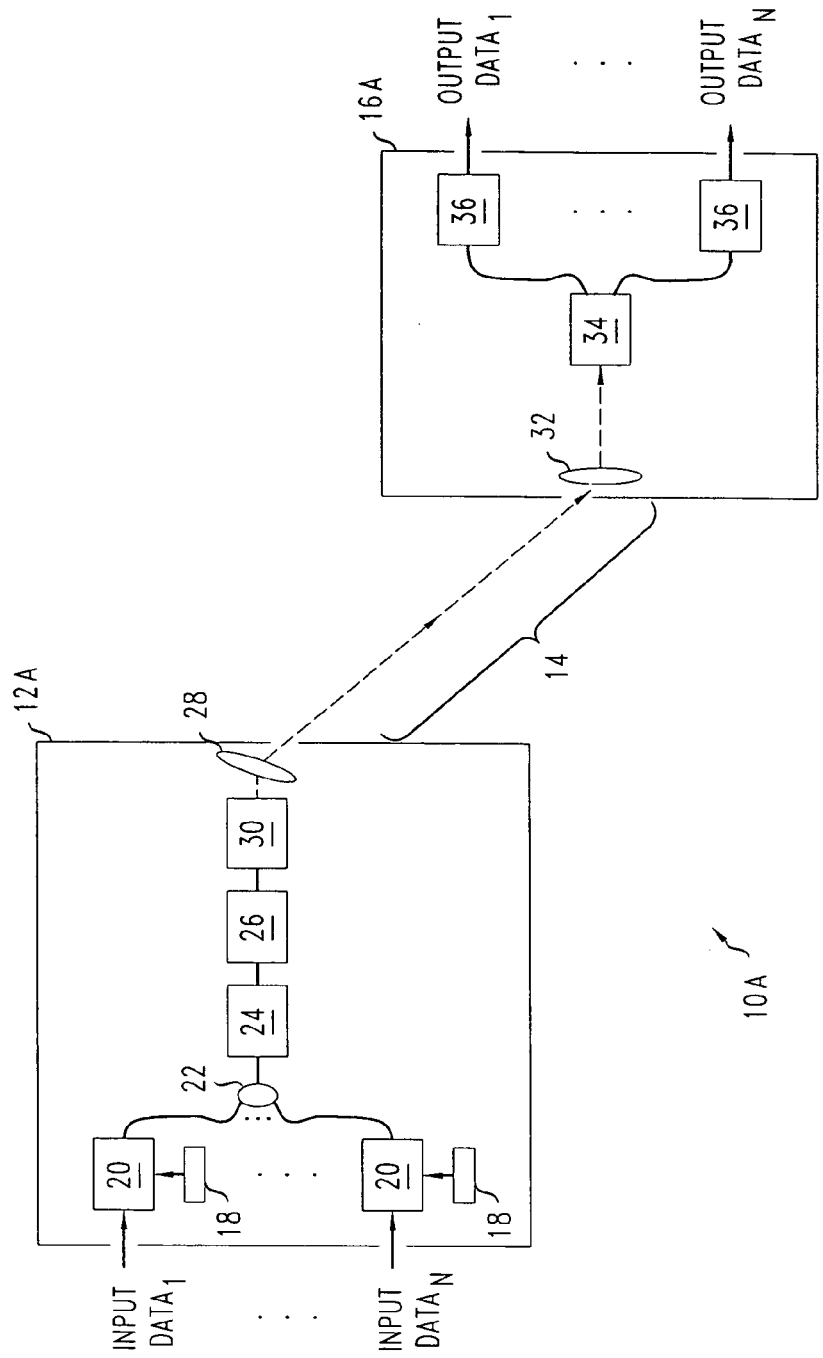

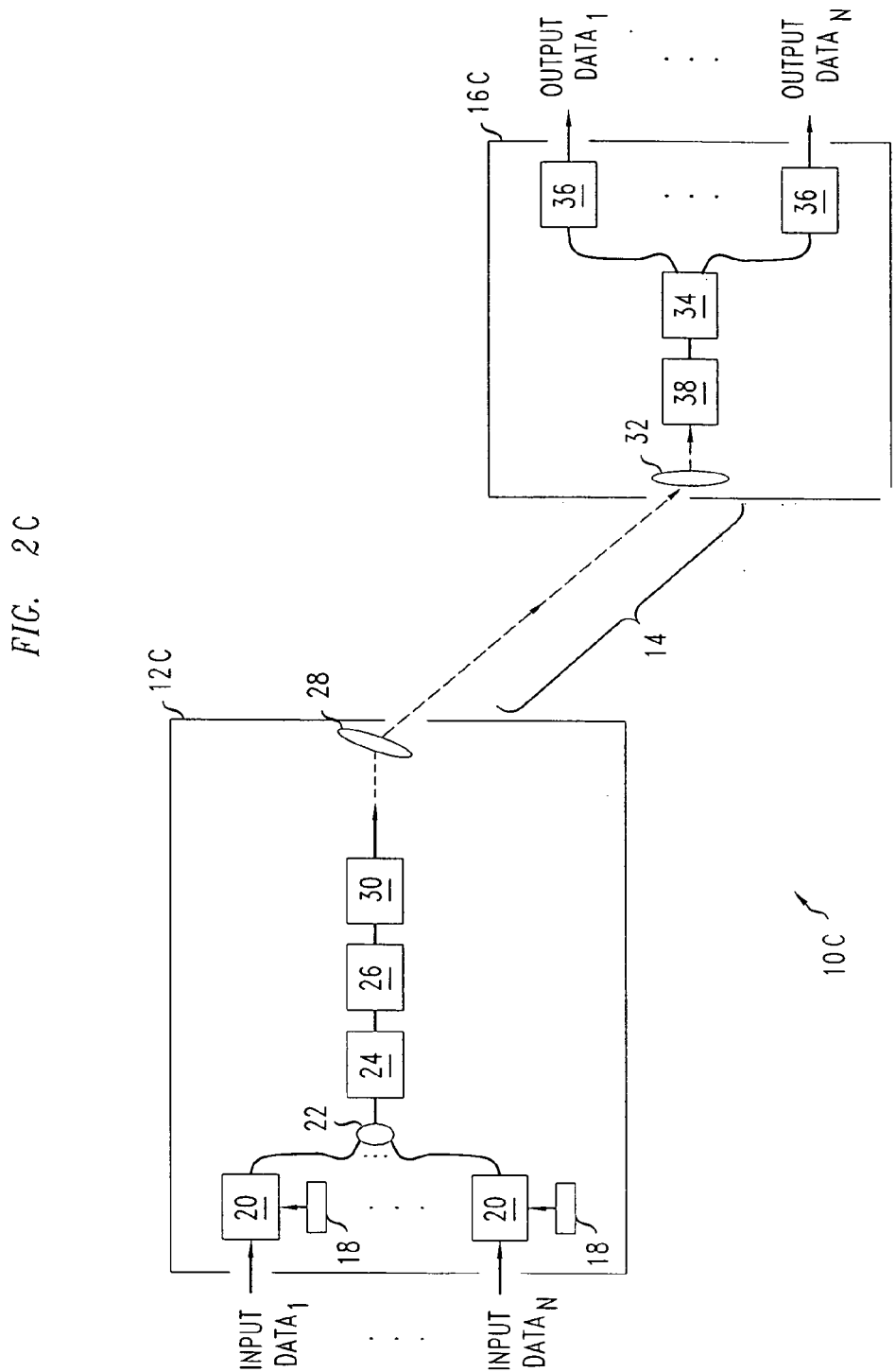

REDUCING CROSSTALK IN FREE-SPACE OPTICAL COMMUNICATIONS

BACKGROUND

1. Field of the Invention

The invention relates to optical amplification and free-space optical communication.

2. Discussion of the Related Art

When the cost to install a transmission cable is high, a free-space optical communication channel can offer an inexpensive alternative for a point-to-point optical communication channel. In a free-space optical communication channel, the data-carrying light beam crosses the transmission region without guiding by a transmission optical waveguide. Thus, use of a free-space optical communication channel can avoid the cost associated with installing a transmission optical fiber. The absence of such installation costs can significantly reduce the total cost of implementing a new point-to-point optical communication system.

The absence of a transmission optical fiber also reduces power transmission efficiencies in the optical communication system. In particular, the diameter of the data-carrying light beam can diverge along the free-space optical communication channel. Thus, a free-space optical communication system may deliver a lower portion of the transmitted light power than a fiber-based optical communication system having an optical communication channel of the same length.

Due to the above-described power transmission inefficiencies, free-space optical communication systems may operate quite differently than conventional fiber optical transmission systems. Often, a free-space optical communication system has a transmitter that produces a high output optical power to compensate for divergence of the data-carrying light beam.

BRIEF SUMMARY

Some embodiments provide communication apparatus that are configured for special conditions found in many free-space optical communication systems. Those conditions may include high output light intensities. Some of the embodiments include features that support high output light powers while still producing only low amounts of optical crosstalk inside of their optical transmitters.

In a first aspect, an apparatus includes an optical transmitter. The optical transmitter includes a modulator, a dispersion adjustment module, and an optical amplifier. The optical transmitter is configured to transmit optical pulses over a free-space optical communication channel. The modulator is configured to produce an optical carrier that is amplitude and/or phase modulated by data. The dispersion adjustment module is connected between the modulator and the amplifier and is configured to substantially change temporal widths of optical pulses received from the modulator by changing cumulative dispersions of the received optical pulses.

In a second aspect, a method includes producing a stream of optical pulses by producing a modulated optical carrier and substantially changing the cumulative dispersions of the optical pulses of the stream to produce corresponding temporally broadened optical pulses. The method includes optically amplifying the temporally broadened optical pulses to produce corresponding amplified optical pulses and transmitting the amplified optical pulses to an optical receiver via a free-space optical communication channel.

BRIEF DESCRIPTION OF THE DRAWINGS

Various embodiments are described more fully by the Figures and Detailed Description of Illustrative Embodiments. Nevertheless, the inventions may be embodied in various forms and are not limited to embodiments described in the Figures and Detailed Description of Illustrative Embodiments.

FIG. 2A is a block diagram for one embodiment of a free-space optical communication system, e.g., for use in the optical communication systems of FIGS. 1A–1B;

FIG. 2C is a block diagram for another alternate embodiment of a free-space optical communication system, e.g., for use in the optical communication systems of FIGS. 1A–1B;

In the Figures and text, like reference numerals indicate elements with similar functions.

In the Figures, the relative dimensions of some features may be exaggerated to more clearly illustrate one or more of the structures therein.

DETAILED DESCRIPTION OF ILLUSTRATIVE EMBODIMENTS

Figure 1A:
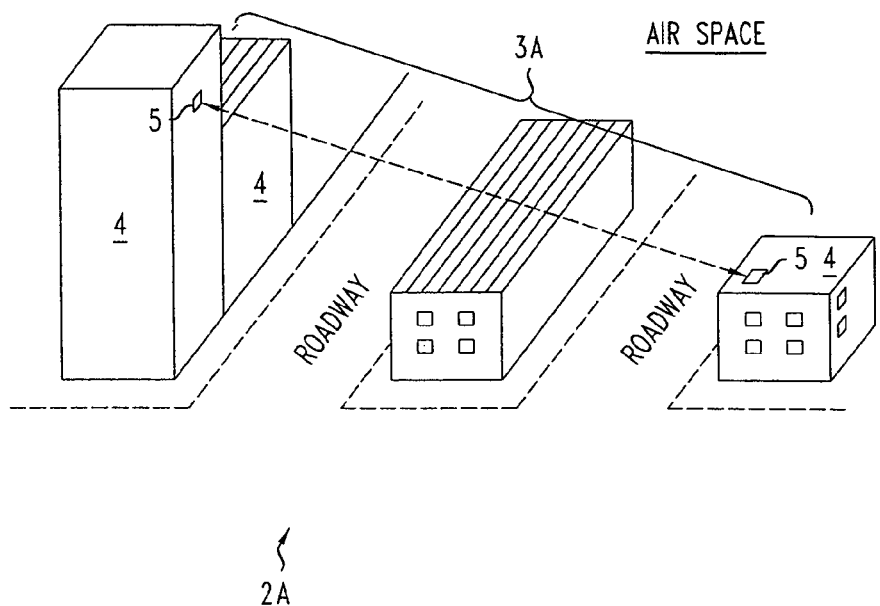
FIG. 1A schematically illustrates an urban point-to-point optical communication system that includes a free-space optical communication channel.
Figure 1B:
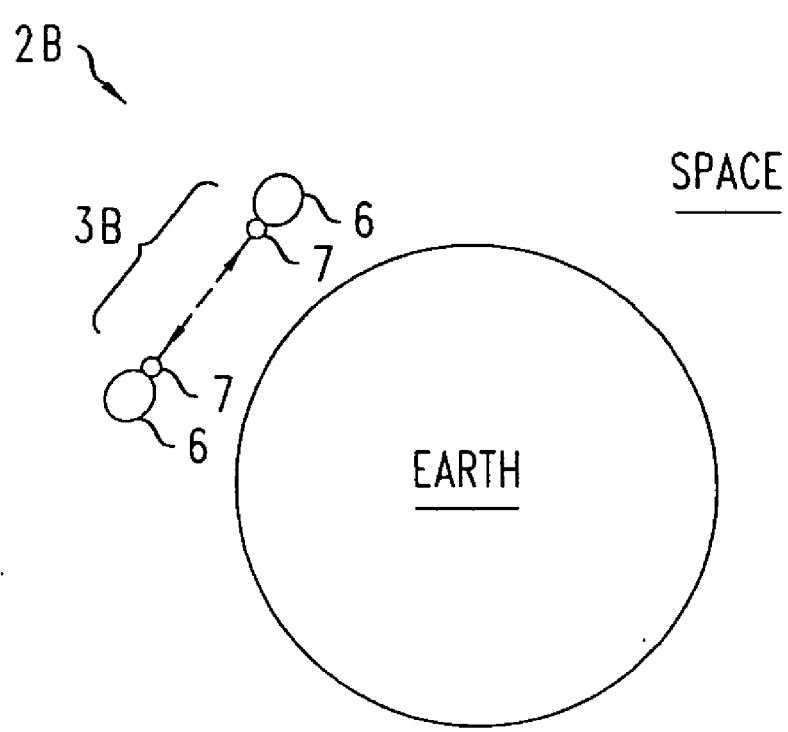
FIG. 1B schematically illustrates a satellite-to-satellite optical communication system that includes a free-space optical communication channel.

FIGS. 1A and 1B show illustrative embodiments of optical communication systems 2A, 2B that use free-space optical communication channels 3A, 3B to transport data-carrying optical pulses. The free-space optical communication channel 3A of FIG. 1A provides point-to-point optical communications between buildings 4 that are located in an urban area. Each communicating building 4 includes an optical transmitter, receiver, or transceiver 5 that is configured for 1-way or 2-way optical communications over an optical communication channel 3A, i.e., the air space of the urban area. The free-space optical communication channel 3B of FIG. 1B provides point-to-point optical communications between satellites 6 that are orbiting about the earth. Each satellite 6 also has an optical transmitter, receiver, or transceiver 7 that supports 1-way or 2-way communications over the outer space optical communication channel 3B.

In optical communication systems 2A, 2B, the free-space optical communication channels 3A, 3B neither guide the data-carrying optical pulses nor cause substantial chromatic dispersion of said optical pulses. In the absence of such waveguiding, the data-carrying light pulses spread laterally or transversely to their propagation directions in the free-space optical communication channels 3A, 3B. For that reason, the optical transmitters 5, 7 of the optical communication systems 2A, 2B often transmit such data-carrying optical pulses with high electric field intensities.

In some optical media, high electric field intensities generate substantial nonlinear optical effects, because of the third-order electrical susceptibility of the media. The nonlinear optical effects can produce inter-channel and/or intra-channel crosstalk in the data-carrying streams propagating through such media. The optical media of free-space optical communication channels often have vanishing or very small third-order electrical susceptibilities and typically also carry low electric field intensities due to large diameters of the data-carrying light beams therein. For that reason, free-space optical communication channels typically generate little such crosstalk. In contrast, third-order electrical susceptibilities can have high values in some components of optical transmitters used for free-space optical communications. Also, electric field intensities can have high values in some such components. For that reason, there is often a risk of producing substantial crosstalk in the optical transmitters used in free-space optical communication systems. The risk of producing crosstalk may be particularly high in the optical amplifier of such optical transmitters, because the optical amplifiers may use media whose third-order electrical susceptibilities have significant magnitudes and may also support high light intensity levels during operation.

Various embodiments of the optical communication systems 2A, 2B use apparatus configured to reduce the generation of optical crosstalk in optical amplifiers of the optical transmitters therein. Some such apparatus are illustrated in the free-space optical communication systems 10A, 10B, 10C, 10D, 10E, and 10F of FIGS. 2A–2F.

Each free-space optical communication system 10A–10F includes a multi-channel optical transmitter 12A, 12B, 12C, 12D, 12E, 12F; a free-space optical communication channel 14, and a multi-channel optical receiver 16A, 16B, 16C. In other embodiments (not shown), the multi-channel optical transmitters 12A–12F and the multi-channel optical receivers 16A–16C may replaced by single wavelength-channel devices.

The multi-channel optical transmitters 12A–12C include N optical sources 18, N optical modulators 20, an N×1 optical multiplexer 22, a first dispersion adjustment module 24, an optical amplifier 26, and beam collimation optics 28.

Each optical source 18 generates a continuous-wave (CW) optical carrier on a wavelength-channel that will be used to carry data. The optical sources are, e.g., conventional high power, narrow-band lasers along with electrical or optical pumping devices.

Each optical modulator 20 amplitude and/or phase modulates a different one of the N streams of input digital data, i.e., Input Data$_1$, . . . , and Input Data$_N$, onto the CW optical carrier that is received from a corresponding one of the optical sources 18. Each optical modulator 20 outputs an amplitude and/or phase modulated optical carrier, i.e., with its data-carrying stream of optical pulses, to the N×1 optical multiplexer 22.

The N×1 optical multiplexer 22 multiplexes the amplitude- and or phase-modulated optical carriers from the optical modulators 20 and delivers the resulting light beam to the first adjustment module 24. The N×1 optical multiplexer 22 may have any conventional construction that would be well-known to those of skill in the art.

The first dispersion adjustment module 24 substantially increases or decreases the magnitude of the cumulative dispersion of optical pulses on wavelength-channels over which the optical transmitters 12A–12C are configured to transmit data. The dispersion adjustment module 24 may generate in the received optical pulses dispersions with magnitudes that are greater than or equal to about $[(0.25 \times 10^5$ giga-bits per second$)/(BR)^2][(1550$ nm$)/\lambda]^2$ pico-seconds per nanometer (ps/nm) or are even greater than or equal to $[(0.5 \times 10^5$ giga-bits per second$)/(BR)^2][(1550$ nm$)/\lambda]^2$. The magnitude of the produced dispersions may also be less than or equal to about $[(4 \times 10^5$ giga-bits per second$)/(BR)^2][(1550$ nm$)/\lambda]^2$ in ps/nm or less than or equal to about $[(2 \times 10^5$ giga-bits per second$)/(BR)^2][(1550$ nm$)/\lambda]^2$ ps/nm. Here, $(BR)^2$ is the square of the per wavelength-channel optical bit-rate produced by modulation in giga-bits per second (Gb/s), and $\lambda$ is the wavelength of the optical carrier in nanometers. At a telecommunication wavelength of 1.55 micro-meters, an exemplary dispersion adjustment modules 24 may produce a dispersion of about 1000 ps/nm or more at a bit-rate of about 10 giga-bits per second and may produce a dispersion of about (1000/16) ps/nm or more at a bit-rate of about 40 giga-bits per second.

In the first dispersion adjustment module 24, substantially changing cumulative dispersion produces optical pulses that are substantially temporally broadened and that have substantially reduced peak intensities. For received optical pulses, the substantially temporal broadening may cause initial full widths at half-maximum intensity of the optical pulses to increase by about 25 percent or more, about 300 percent or more, e.g., about 335 percent. The substantial temporal broadening may cause peak intensities of the initial optical pulses to decrease by about 20 percent or more, about 67 percent or more, and even about 93 percent. Such decreases in the peak intensities can lower crosstalk generation in the optical amplifier 26.

The first dispersion adjustment module 24 may be formed by a variety of lumped optical devices. One exemplary device is a roll of single-mode optical fiber that has an ordinary or anomalous dispersion. The roll of optical fiber has an appropriate length for producing the above-described amount of temporal broadening and peak intensity reduction. Another exemplary device is an optical path that includes a diffraction grating and one or more mirrors configured to cause light to undergo a double-pass reflection off the diffraction grating. The double-pass reflection produces the desired change in the cumulative dispersion of the optical pulses. One such device is described in U.S. patent application Ser. No. 10/082,870, filed Feb. 25, 2002 by Mark J. Schnitzer, which is incorporated by reference herein in its entirety. Other exemplary devices include a fiber Bragg grating that is configured to produce the desired dispersion change. In light of the above-disclosure, those of skill in the art would be able to make various devices for the first dispersion adjustment module 24.

The optical amplifier 26 amplifies the optical pulses of a data-carrying stream to produce corresponding amplified optical pulses on an output data-carrying stream. The optical amplifier 26 can be any conventional optical amplifier, e.g., a rare-earth doped fiber amplifier such as an erbium doped fiber amplifier or a Raman amplifier.

The beam collimation optics 28 collimates the amplified optical pulses of the output stream to produce a collimated data-carrying light beam that is directed into the free-space optical communication channel 14. The beam collimation optics 28 directs the data-carrying light beam towards the optical receiver 16A–16C. The beam collimation optics 28 may include any conventional combination of one or more refractive lenses and/or reflective optical devices for performing such collimation and beam directing functions.

The optical transmitters 12A and 12C also include a second dispersion adjustment module 30. The second dispersion adjustment module 30 substantially increases or decreases magnitudes of the cumulative dispersions of the received amplified optical pulses. The substantial changes to cumulative dispersions may have magnitudes greater than or equal to about $[(0.25 \times 10^5 \text{ Gb/s})/(BR)^2][(1550 \text{ nm})/\lambda]^2$ picoseconds per nanometer (ps/nm) or even greater than or equal to $[(0.5 \times 10^5 \text{ Gb/s})/(BR)^2][(1550 \text{ nm})/\lambda]^2$ in the received optical pulses. The magnitude of the changes to cumulative dispersions may also be less than or equal to about $[(4 \times 10^5 \text{ Gb/s})/(BR)^2][(1550 \text{ nm})/\lambda]^2$ in ps/nm or less than or equal to about $[(2 \times 10^5 \text{ Gb/s})/(BR)^2][(1550 \text{ nm})/\lambda]^2$ ps/nm.

By substantially changing dispersions, the second dispersion adjustment module 30 produces optical pulses that are substantially temporally narrower and that have substantially larger peak intensities. For the received amplified optical pulses, AOPs, the temporal narrowing may decrease full widths at half-maximum intensity of the amplified optical pulses, AOPs, by about 25 percent or more or may even decrease full widths at half-maximum intensity of the amplified optical pulses, AOPs, by about 75 percent or more. The substantial changes to dispersions may cause peak intensities of the received amplified optical pulses, AOPs, to increase by about 20 percent or more and may even cause the peak intensities to increase by about 400 percent or more. The second dispersion adjustment module 30 delivers the narrowed optical pulses to the beam collimation optics 28 for collimation and transmission to the free-space optical communication channel 14.

The dispersion adjustment module 30 may be any suitable conventional lumped device. One exemplary device is a roll of single-mode optical fiber that has ordinary or anomalous dispersion. The roll of optical fiber has a length that is suitable to produce the above-described amounts of temporal narrowing and/or peak intensity augmentation. Another exemplary device is an optical path that includes a diffraction grating and one or more mirrors configured to cause light to undergo a double-pass reflection off the diffraction grating. The double-pass reflection produces the change in the cumulative dispersion, e.g., as described in U.S. patent application Ser. No. 10/082,870, filed Feb. 25, 2002 by Mark J. Schnitzer. Other exemplary devices include a fiber Bragg grating that is configured to produce the desired dispersion change. In light of the above-disclosure, those of skill in the art would be able to make exemplary devices for the second dispersion adjustment module 30.

The multi-channel optical receivers 16A–16C include beam-focusing optics 32, a 1×N optical demultiplexer 34, and N optical demodulators 36.

The beam-focusing optics 32 focuses onto an input of the 1×N optical demultiplexer 34 that portion of the transmitted light beam that is received from the free-space channel 14. The beam-focusing optics 32 may include any suitable combination of conventional refractive optical lenses and/or conventional optical mirrors that would be known to those of skill in the art.

The 1×N optical demultiplexer 34 separates the different data-carrying streams of optical pulses according to wavelength-channel and directs each such stream to a different optical demodulator 36. The optical demultiplexer 34 may include any suitable conventional demultiplexing structure that would be known to those of skill in the art.

The optical demodulators 36 recover from the received streams of optical pulses corresponding output streams of digital data, i.e., Output Data$_1$, . . . , and Output Data$_N$. The optical demodulators 36 may have any conventional form that would be known to those of skill in the art.

The optical receiver 16B and 16C also include a dispersion adjustment module 38 that is located to receive the data-carrying streams of optical pulses from the beam focusing optics 32. The dispersion adjustment module 38 substantially increases or decreases magnitudes of the cumulative dispersions of the received optical pulses in a manner that causes substantial temporal narrowing and peak intensity enhancement in the received optical pulses. The dispersion adjustment module 38 may change the cumulative dispersions of the received optical pulses by amounts in the same ranges as those described above for the dispersion adjustment module 30. The dispersion adjustment module 38 may produce amounts of temporal narrowing and peak intensity augmentation in the received optical pulses that are also in the same ranges as those described for the dispersion adjustment module 30. The dispersion adjustment module 38 delivers the temporally narrowed and peak intensity enhanced optical pulses to the 1×N optical demultiplexer 34.

The lumped dispersion adjustment module 38 may be constructed as described above for the dispersion adjustment module 30. The dispersion adjustment module 30 and/or the dispersion adjustment module 38 may, e.g., be configured to produce a total dispersion change that is selected to approximately return the temporal widths of the amplified optical pulses, AOPs, to the temporal widths of the optical pulses that were received by the first dispersion adjustment module 24.

In the optical transmitters 12A–12C, the optical modulators 20 may be conventional single or multi-stage devices. For example, the optical modulators 20 may first produce a stream of return-to-zero (RZ) optical pulses and then, phase modulate individual ones of the return-to-zero optical pulses to carry the N input data streams.

In some embodiments of the optical transmitters 12D–12F, direct modulation may produce N streams of optical pulses that are subsequently phase modulated to produce phase modulated RZ optical pulses that carry the N input data streams.

Figure 2B:
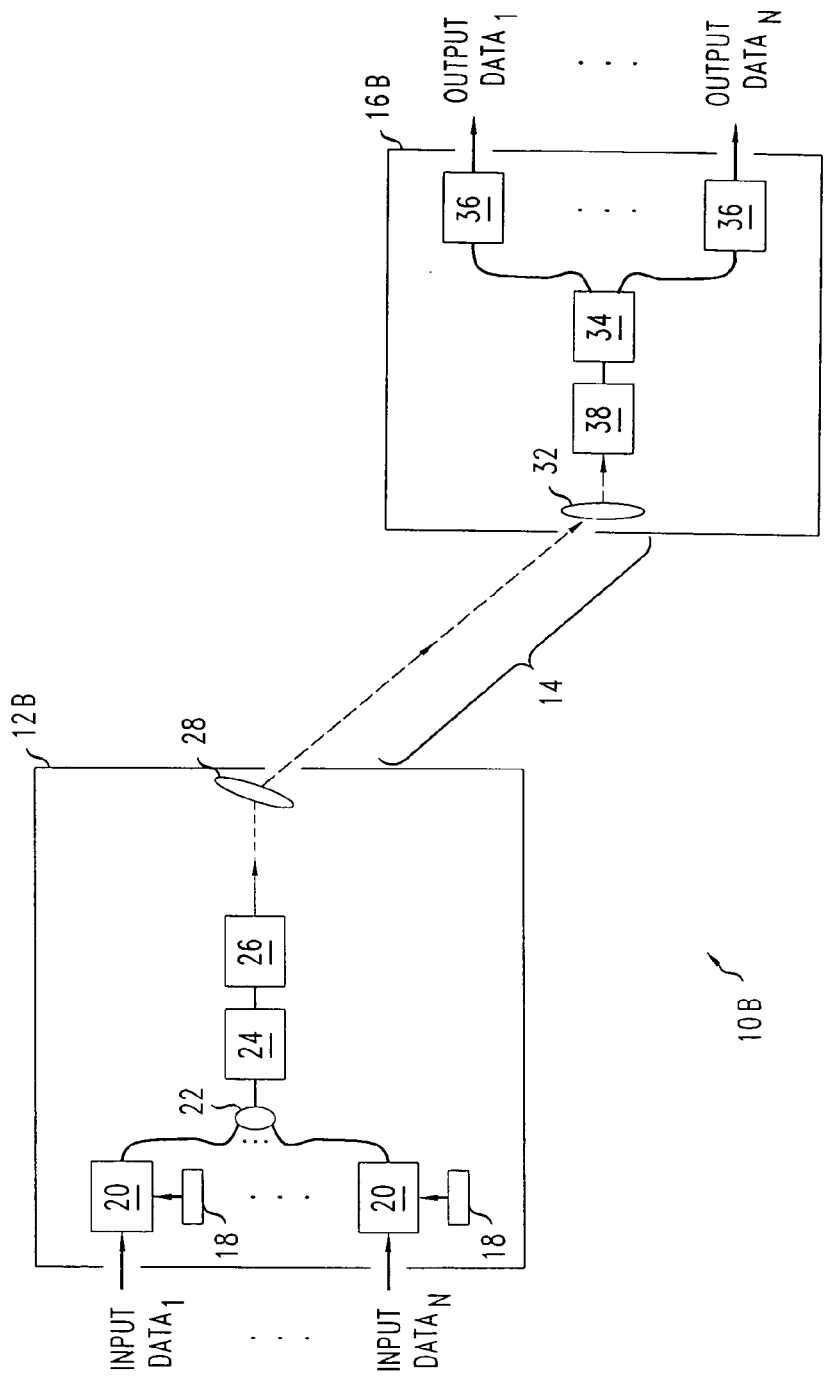
FIG. 2B is a block diagram for an alternate embodiment of a free-space optical communication system, e.g., for use in the optical communication systems of FIGS. 1A–1B.
Figure 2D:
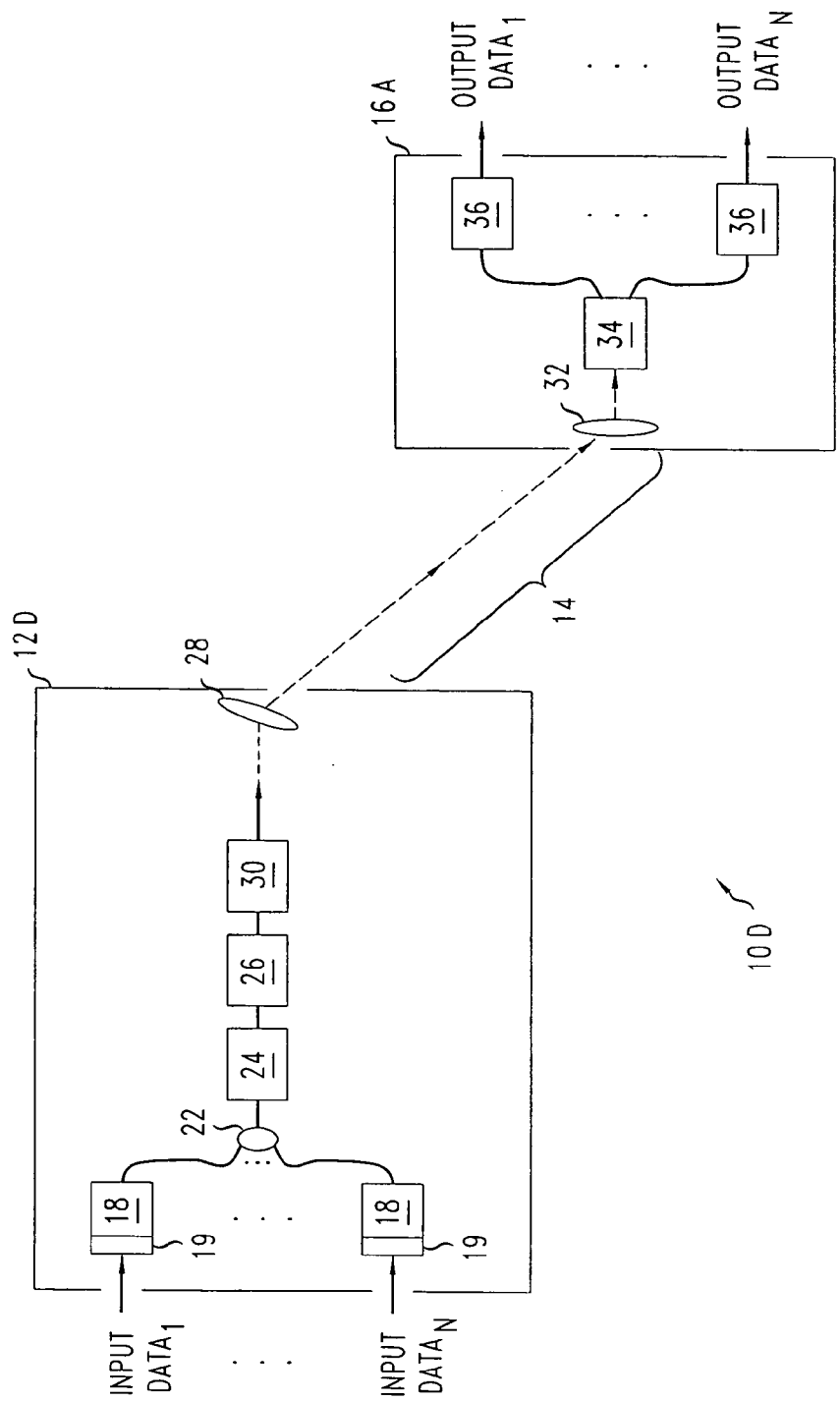
FIGS. 2D, 2E, and 2F are block diagrams for other alternate embodiments of free-space optical communication systems, e.g., for use in the optical communication systems of FIGS. 1A–1B.
Figure 2E:
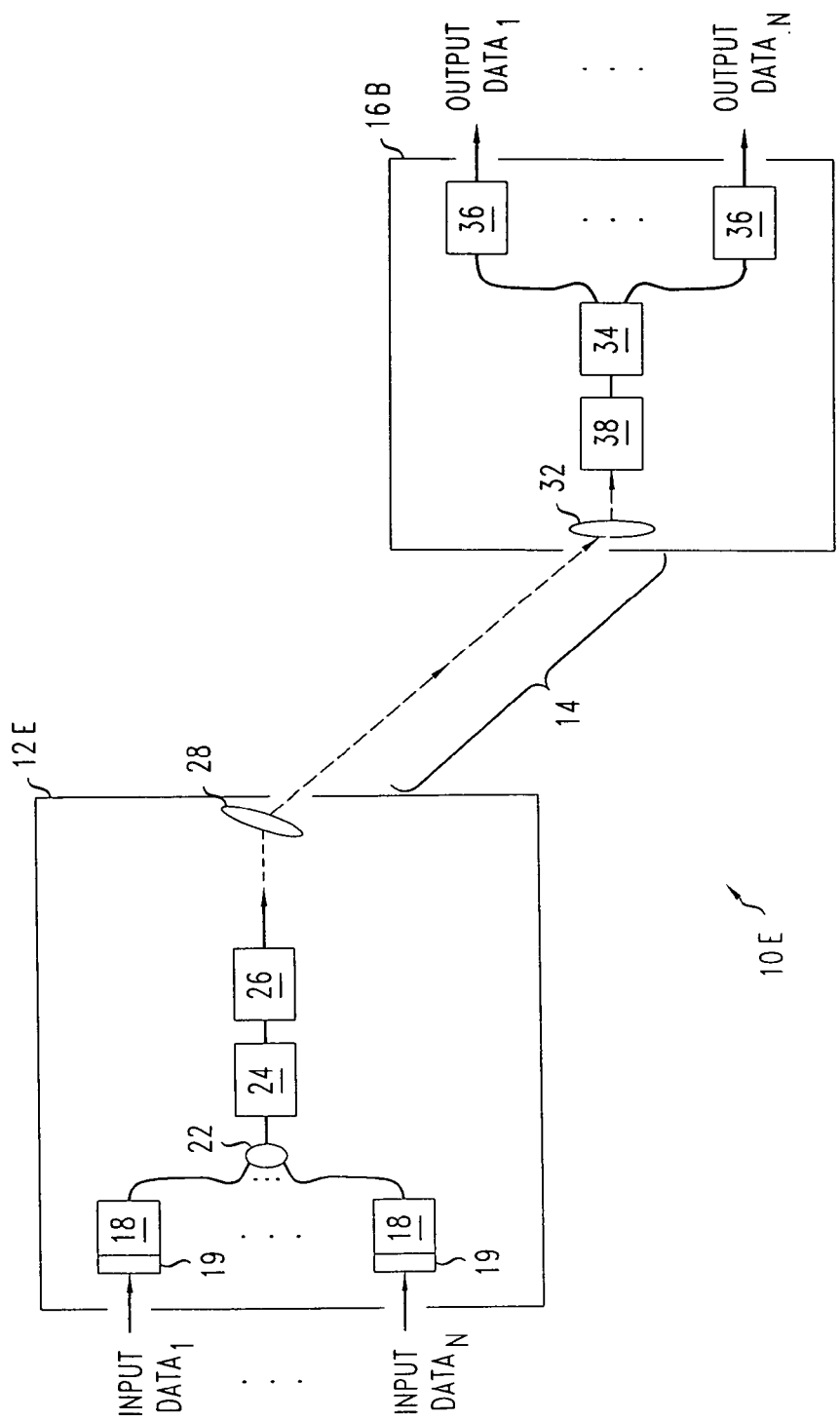
Figure 2F:
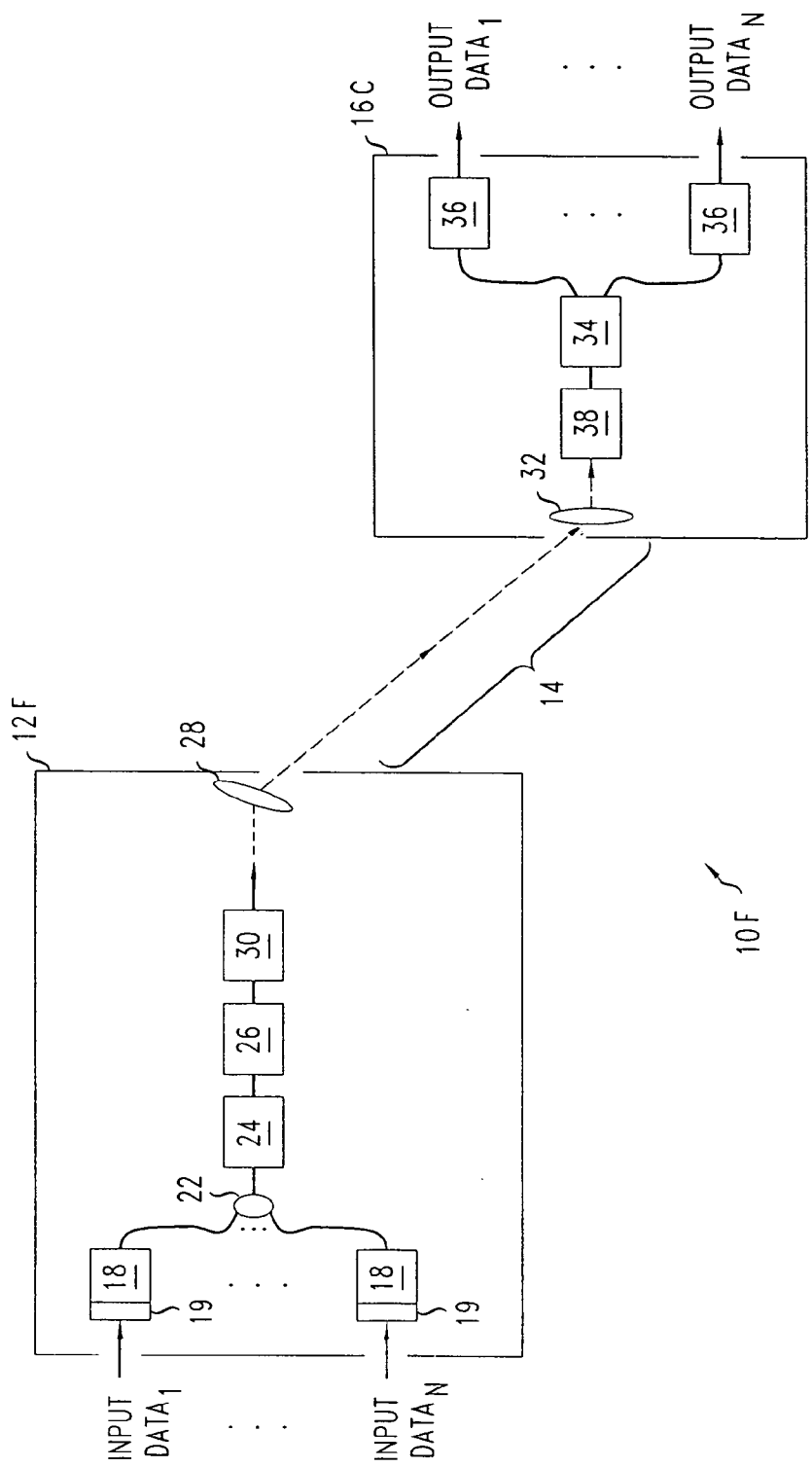

The free-space optical communication systems 10D–10F of FIGS. 2D–2F include a free-space optical communication channel 14 and a multi-channel optical receiver 16A–16C as already described with respect to and also include a multi-channel optical transmitter 12D–12F. The multi-channel optical transmitters 12D, 12E, and 12F have elements as described in respective multi-channel optical transmitters 12A, 12B, and 12C of FIGS. 2A–2C. Also, in the multi-channel optical transmitters 12D–12F, N optical sources 18 and associated pumping circuits 19 replace the N optical sources 18 and the optical modulator 20 of the optical transmitters 12A–12C. In the multi-channel optical transmitters 12D–12F, each optical source 18 is a laser capable of producing a CW optical carrier in one of the N wavelength-channels, and each pumping circuit 19 is configured to direct amplitude modulate the associated optical source 18. The direct amplitude modulation involves varying pumping levels between being above lasing threshold and below lasing threshold values. The direct amplitude modulation produces N optical carriers that are modulated by the N input data streams, i.e., Input Data$_1$, . . . , Input Data$_1$. Thus, the combination of an optical source 18 and an associated pump circuit 19 functions as a modulator in each of the optical transmitters 12D, 12E, and 12F.

Figure 3A:
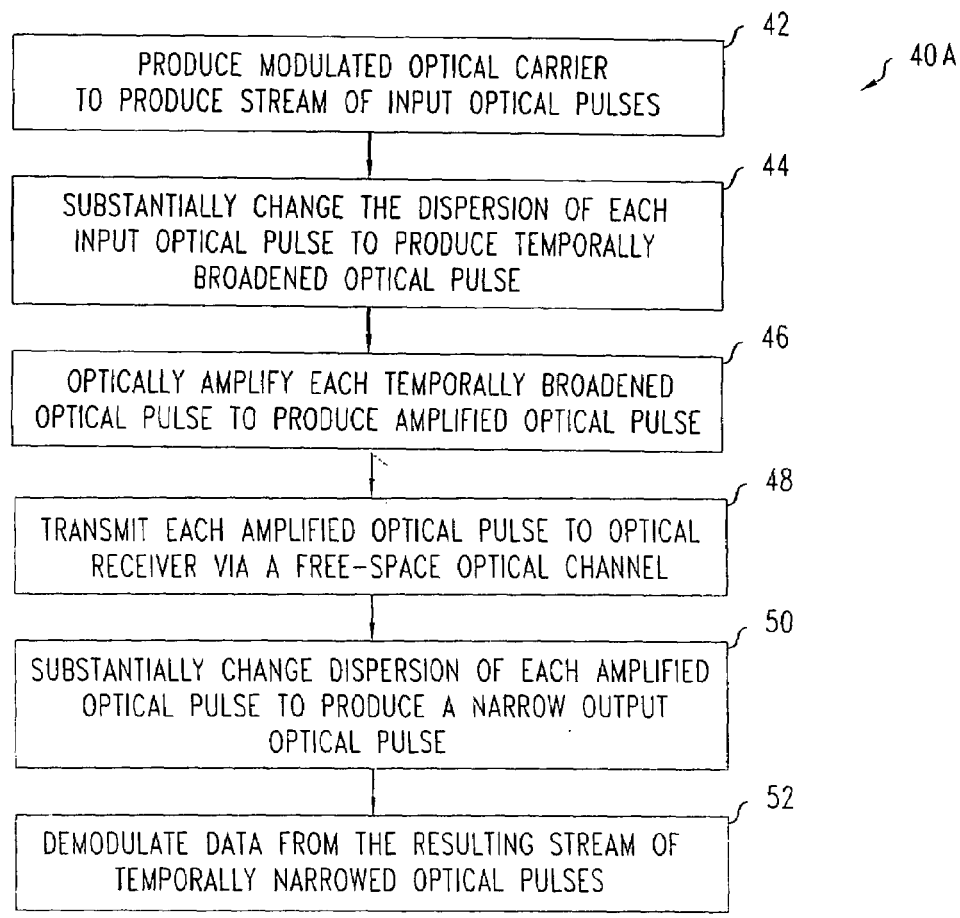
FIG. 3A is a flow chart that illustrates a method of performing optical communications, e.g., using the free-space optical communication systems of FIGS. 2A, 2C, 2D, and 2F.
Figure 3B:
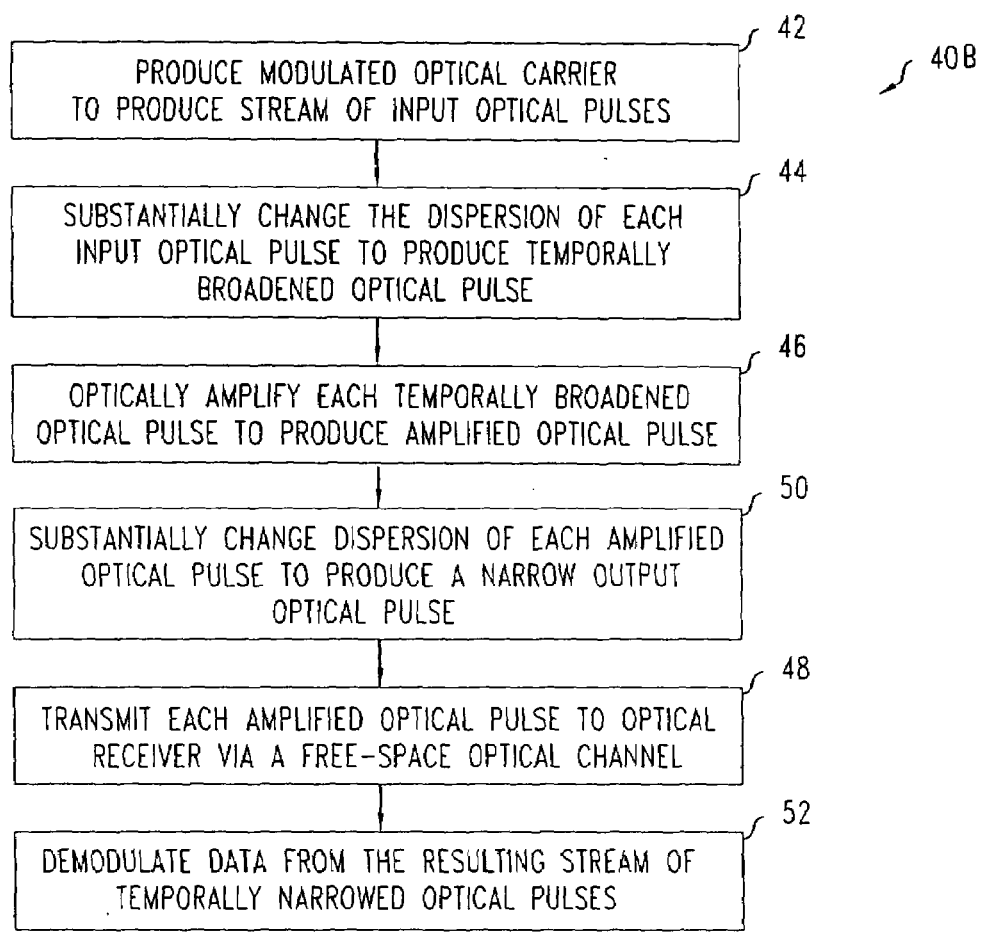
FIG. 3B is a flow chart that illustrates an alternate method of performing optical communications, e.g., using the free-space optical communication systems of FIGS. 2B, 2C, 2E, and 2F.

FIGS. 3A and 3B illustrates methods 40A–40B of optically communicating data via a free-space optical communication channel, e.g., in the free-space optical communication systems 10A–10F of FIGS. 2A–2F. The methods 40A–40B cause an exemplary optical pulse to evolve as shown schematically in FIG. 4.

The methods 40A–40B include producing an amplitude and/or phase modulated optical carrier that carries a stream of digital data (step 42). The production of the modulated optical carrier may result, e.g., from direct amplitude modulation of a laser or may result, e.g., from the optical modulation of a CW optical carrier produced by a laser. The production of the amplitude and/or phase modulated CW optical carrier produces a stream of input optical pulses (IOPs) in the wavelength-channel of the optical carrier. The production of the amplitude and/or phase modulating may be performed by one of the optical modulators 20 as in FIGS. 2A–2C or may be performed by the combination of one of the optical sources 18 and the associated pumping circuits 19 as in FIGS. 2D–2F.

Figure 4:
FIG. 4 schematically illustrates the evolution of an exemplary optical pulse of the data-carrying stream in the methods of FIGS. 3A–3B.

The methods 40A–40B include substantially changing the dispersion of each input optical pulse, IOP, to produce a corresponding substantially temporally broadened optical pulse (TBOP) (step 44). The substantially temporally broadened optical pulse, TBOP, has a lower average light intensity and a lower peak light intensity than the corresponding input optical pulse, IOP, as illustrated in FIG. 4. The substantially temporal broadening may cause initial full widths at half-maximum intensity of the input optical pulses, IOPs, to increase by about 25 percent or more, about 300 percent or more, e.g., 335 percent. The substantial temporal broadening may cause peak intensities of the input optical pulses, IOPs, to decrease by about 20 percent or more, about 67 percent or more.

At the step 44, the substantial change to the dispersion of an input optical pulse, IOP, may be produced by passing the input optical pulse, IOP, through the dispersion adjustment module 24. The passage through the dispersion adjustment module 24 may substantially increase or decrease the dispersion of the input optical pulse, IOP, e.g., to produce a final cumulative dispersion whose magnitude is greater than or equal to about $[(0.25 \times 10^5 \text{ Gb/s})/(BR)^2][(1550 \text{ nm})/\lambda]^2$ ps/nm or is greater than or equal to about $[(0.5 \times 10^5 \text{ Gb/s})/(BR)^2][(1550 \text{ nm})/\lambda]^2$. The magnitude of the final cumulative dispersion may also be less than or equal to about $[(4 \times 10^5 \text{ Gb/s})/(BR)^2][(1550 \text{ nm})/\lambda]^2$ in ps/nm or even may be less than or equal to $[(2 \times 10^5 \text{ Gb/s})/(BR)^2][(1550 \text{ nm})/\lambda]^2$ ps/nm.

The methods 40A–40B include optically amplifying each temporally broadened optical pulse, TBOP, to produce a corresponding amplified optical pulse (AOP) with a larger time-integrated total power (step 46). The optically amplifying step 46 may be performed by passing each temporally broadened optical pulse, TBOP, through the optical amplifier 26 while pumping the optical amplifier. The amplification increases the time-integrated power of the temporally broadened optical pulse, TBOP, without significantly increasing its temporal width as illustrated in FIG. 4. Nevertheless, each amplified optical pulse, AOP, has a lower peak light intensity than it would otherwise have had in the absence of the earlier temporal broadening of the optical pulse.

Due to the lower peak intensities, the amplified optical pulses, AOPs, generate less inter-channel and/or intra-channel crosstalk than would be otherwise produced in the absence of such pre-amplification dispersion-based broadening. For that reason, the optical pulses are maintained in "temporally broadened forms" in any portion of the optical transmitter that is highly susceptible to produce crosstalk, e.g., in the media of the optical amplifier. The optical pulses may be kept broad in any parts of the optical transmitters 12A–12F where light intensities are high and/or the third-order nonlinear susceptibilities of the media through which light propagates are high.

The methods 40A–40B include transmitting the stream of amplified optical pulses, AOPs, to a free-space optical communication channel, e.g., the optical communication channel 14, in a manner that delivers the optical pulses to an optical receiver, e.g., one of the optical receivers 16A–16F (step 48). The free-space optical communication channel may be, e.g., a region of the atmosphere between two buildings as in the free-space optical communication channel 3A of FIG. 1A, or may include, e.g., a region of outer space as in the free-space optical communication channel 3B of FIG. 1B. The free-space optical communication channel provides for point-to-point communications between the optical transmitter, e.g., any of the optical transmitters 12A–12F, that performs the transmitting and the optical receiver, e.g., any of the optical receivers 16A–16F, that receives the transmitted data-carrying optical pulses.

The methods 40A–40B include substantially changing the cumulative dispersion of each amplified optical pulse, AOP, to produce a corresponding output optical pulse (OOP) that is substantially temporally narrower than the corresponding amplified optical pulse, AOP (step 50). This substantial temporal narrowing may decrease full widths at half-maximum intensity of the amplified optical pulses, AOPs, by about 25 percent or more or may even decrease the full widths at half-maximum intensity of the amplified optical pulses, AOPs, by about 75 percent or more. For example, the output optical pulse, OOP may have about the temporal width of the corresponding input optical pulse, IOP, which is, in turn, much narrower than the corresponding amplified optical pulse, AOP, as illustrated in FIG. 4. This temporal narrowing also produces an associated increase in the average and peak intensities of the optical pulses as is also illustrated in FIG. 4. This change to temporal widths and/or intensities of optical pulses may be advantageous for the subsequent demodulation of data there from.

At the step 50, the method 40A includes making this substantial change to an optical pulse's dispersion prior to transmission of the optical pulse to the free-space optical communication channel, e.g., as in the lumped dispersion adjustment module 30 of FIGS. 2A, 2C, 2D, and 2F.

At the step 50, the method 40B includes making this substantial change to the optical pulse's cumulative dispersion after receipt of the optical pulse from the free-space optical communication channel, as in the lumped dispersion adjustment module 38 of FIGS. 2B, 2C, 2E, and 2F.

In some embodiments, the methods 40A–40B also make a substantial change of an optical pulse's cumulative dispersion both before transmission of the optical pulse to the free-space optical communication channel and after receipt of the optical pulse from the free-space optical communication channel as in the lumped dispersion adjustment modules 30, 38 of FIGS. 2C and 2F. The above-described substantial changes to dispersions of optical pulses may involve increasing or decreasing the magnitudes of the cumulative dispersions of the amplified optical pulses, AOPs by, at least, $[(0.25 \times 10^5 \text{ Gb/s})/(BR)^2][(1550 \text{ nm})/\lambda]^2$ ps/nm or even by $[(0.5 \times 10^5 \text{ Gb/s})/(BR)^2][(1550 \text{ nm})/\lambda]^2$ ps/nm or more.

Since the free-space optical communication channel is typically the atmosphere and/or outer space, the free-space optical communication channel is not expected to substantially temporally broaden the amplified optical pulses. Thus, at the step 50, a change of the cumulative dispersion that is about equal in magnitude and opposite in sign to the change to the cumulative dispersion at the step 44 may produce an output optical pulse (OOP) having substantially the cumulative dispersion and the temporal width of the corresponding input optical pulse (IOP).

The methods 40A–40B also include demodulating data from the resulting stream of temporally narrowed optical pulses, e.g., in one of the N demodulators 36 of FIGS. 2A–2F (step 52). Such demodulation may be enhanced by the earlier temporal narrowing of the optical pulses, because said temporal narrowing typically increases peak intensities of the optical pulses. The demodulation may also be enhanced by the earlier temporal narrowing of the optical pulses, because said temporal narrowing typically decreases the amount of overlap between adjacent ones of the optical pulses. Indeed, the temporal broadening produced by the dispersion changes of the step 44 may cause overlaps between nearby optical pulses that could otherwise interfere with the faithful demodulation of the stream of digital data that is carried by said stream of optical pulses.

From the disclosure, drawings, and claims, other embodiments of the invention will be apparent to those skilled in the art.

What we claim is:

1. An apparatus, comprising:
   an optical transmitter that includes a modulator, a dispersion adjustment module, and an optical amplifier, the transmitter being configured to transmit optical pulses over a free-space optical communication channel; and
   wherein the modulator is configured to produce an optical carrier that is amplitude and/or phase modulated by data; and
   wherein the dispersion adjustment module is connected between the modulator and the amplifier and is configured to substantially change temporal widths of optical pulses received from the modulator by changing dispersions of the received optical pulses.

2. The apparatus of claim 1, further comprising a second dispersion adjustment module being connected to cause substantial temporal narrowing of optical pulses that have passed through the optical amplifier.

3. The apparatus of claim 2, wherein the second dispersion adjustment module is located in the optical transmitter.

4. The apparatus of claim 2, further comprising:
   an optical receiver that is located to receive the transmitted optical pulses from the free-space optical communication channel.

5. The apparatus of claim 4, wherein the second dispersion adjustment module is located in the optical receiver.

6. The apparatus of claim 4, further comprising:
   a third dispersion adjustment module being connected to cause substantial temporal narrowing of optical pulses that have passed through the optical amplifier, the third dispersion adjustment module being located in the optical receiver.

7. The apparatus of claim 6, wherein the second dispersion adjustment module be configured to decrease temporal widths of optical pulses that are output by the amplifier by at least about 20 percent.

8. The apparatus of claim 1, wherein the dispersion adjustment module is configured to change magnitudes in pico-seconds per nanometer of dispersions of optical pulses received therein to be at least $[0.25\times10^5$ giga-bits per second$][1550$ nanometers$)/\lambda]^2$ over the square of the per wavelength-channel bit-rate in giga-bits per second, $\lambda$ being the wavelength of the optical pulses in nanometers.

9. The apparatus of claim 2, wherein the second dispersion adjustment module is configured to decrease temporal widths of optical pulses received therein by about 20 percent or more.

10. The apparatus of claim 2, wherein the second dispersion adjustment module is configured to increase peak intensities of optical pulses received by the second dispersion adjustment module by about 25 percent or more.

11. A method, comprising:
    producing a stream of optical pulses by producing a modulated optical carrier;
    substantially changing the dispersions of the optical pulses of the stream to produce corresponding temporally broadened optical pulses;
    optically amplifying the temporally broadened optical pulses to produce corresponding amplified optical pulses; and
    transmitting the amplified optical pulses to an optical receiver via a free-space optical communication channel.

12. The method of claim 11, further comprising:
    substantially changing dispersions of optical pulses that have been optically amplified to produce corresponding substantially temporally narrowed optical pulses.

13. The method of claim 12, further comprising:
    demodulating a stream of data from the substantially temporally narrowed optical pulses.

14. The method of claim 11, wherein the substantially changing the dispersions increases the temporal widths of the optical pulses of the stream by at least about 25 percent.

15. The method of claim 11, wherein the substantially changing the dispersions causes the optical pulses of the stream to have dispersions whose magnitudes in pico-seconds per nanometer are at least $[0.25\times10^5$ giga-bits per second$][(1550$ nanometers$)/\lambda]^2$ over the square of the per wavelength-channel bit-rate in giga-bits per second, $\lambda$ being the wavelength of the optical pulses in nanometers.

16. The method of claim 11, wherein the substantially changing dispersions of the optically amplified optical pulses includes decreasing temporal pulse widths of the optically amplified optical pulses by about 20 percent or more.

17. The method of claim 11, wherein the substantially changing dispersions of the optically amplified optical pulses includes increasing peak intensities of optical pulses by about 25 percent or more.

* * * * *